US008056121B2

(12) United States Patent
Hamilton, II et al.

(10) Patent No.: US 8,056,121 B2
(45) Date of Patent: Nov. 8, 2011

(54) VIRTUAL UNIVERSE ACCOUNT PROTECTION

(75) Inventors: Rick A. Hamilton, II, Charlottesville, VA (US); James R. Kozloski, New Fairfield, CT (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1000 days.

(21) Appl. No.: 11/924,769

(22) Filed: Oct. 26, 2007

(65) Prior Publication Data

US 2009/0113524 A1    Apr. 30, 2009

(51) Int. Cl.
*H04L 9/32* (2006.01)
*H04L 9/00* (2006.01)
*G06F 7/04* (2006.01)

(52) U.S. Cl. ........... 726/4; 726/5; 726/6; 726/7; 726/27; 726/28; 713/182; 713/183; 713/184; 713/185

(58) Field of Classification Search .................. 726/4
See application file for complete search history.

(56) References Cited

U.S. PATENT DOCUMENTS

| 2005/0027713 | A1* | 2/2005 | Cameron et al. ............... 707/100 |
| 2005/0179685 | A1* | 8/2005 | Kake et al. ..................... 345/419 |
| 2009/0037983 | A1* | 2/2009 | Chiruvolu et al. ............... 726/4 |

OTHER PUBLICATIONS

Adrian Bullock "Access Control in Virtual Environment", ACM 1997.*
Schneider, Fred B., *Enforceable Security Policies*, ACM Transactions on Information and System Security, vol. 3, No. 1., Published by: ACM Press http://doi.acm.org/10.1145/353323.353382,(Feb. 2000),30-50.
Bullock, Adrian et al., *Access control in virtual environments*, Proceedings of the ACM symposium on Virtual reality software and technology, Published by: ACM Press http://doi.acm.org/10.1145/261135.261142 Lausanne, Switzerland,(Sep. 1997),29-35.

* cited by examiner

*Primary Examiner* — Longbit Chai
(74) *Attorney, Agent, or Firm* — DeLizio Gilliam, PLLC

(57) ABSTRACT

A protection mechanism(s) for a virtual universe account maintains integrity of the virtual universe account as well as the virtual universe. An avatar associated with a virtual universe account may be misappropriated and/or used inappropriately by a non-comporting user against the wishes or without the knowledge of the virtual universe account owner. A non-comporting user (i.e., a user not authorized to use the virtual universe account, an authorized user who misuses a virtual universe account, etc.) can use an avatar to perform potentially damaging and/or damaging activities in the virtual universe (e.g., destroy property, impact reputation associated with the virtual universe account, reduce value of the virtual universe account, etc.) Embodiments of the inventive subject matter detect when a user misappropriates and/or misuses a virtual universe account (i.e., detects a non-comporting user), and attempts to restore state of the virtual universe prior to the misuse and/or misappropriation.

19 Claims, 9 Drawing Sheets

US 8,056,121 B2

VIRTUAL UNIVERSE ACCOUNT PROTECTION

TECHNICAL FIELD

Embodiments of the inventive subject matter generally relate to the field of virtual universe systems and, more particularly, to virtual universe account security.

BACKGROUND

Virtual universe applications allow people to socialize and interact in a virtual universe. A virtual universe ("VU") is a computer-based simulated environment intended for its residents to traverse, inhabit, and interact through the use of avatars. Many VUs are represented using 3-D graphics and landscapes, and are populated by many thousands of users, known as "residents." Other terms for VUs include metaverses and "3D Internet."

SUMMARY

The present application describes embodiments for protecting a virtual universe account. For instance, a method comprises collecting data representing one or more characteristics of a user controlling an avatar in a virtual universe. It is determined if the collected data fails to comport with a permitted user profile associated with a virtual universe account, which is associated with the avatar. The one or more activities by the avatar that modify persistent state of the virtual universe, at least with respect to the avatar, are recorded. The virtual universe is then restored to a state prior to the recorded one or more activities.

DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

A protection mechanism(s) for a virtual universe account maintains integrity of the virtual universe account as well as the virtual universe. An avatar associated with a virtual universe account may be misappropriated and/or used inappropriately by a non-comporting user against the wishes or without the knowledge of the virtual universe account owner. A non-comporting user (i.e., a user not authorized to use the virtual universe account, an authorized user who misuses a virtual universe account, etc.) can use an avatar to perform potentially damaging and/or damaging activities in the virtual universe (e.g., destroy property, impact reputation associated with the virtual universe account, reduce value of the virtual universe account, etc.) Embodiments of the inventive subject matter detect when a user misappropriates and/or misuses a virtual universe account (i.e., detects a non-comporting user), and attempts to restore state of the virtual universe prior to the misuse and/or misappropriation. For example, an avatar controlled by a non-comporting user may move items (e.g., a virtual car, a virtual desk, a virtual picture frame, etc.) from their respective "default locations" (e.g., a picture frame default location is on a corner of a shelf in an office) in a virtual universe residence or virtual universe office. A default location can be defined by a user, an administrator, be set as an attribute in an object, etc. To restore state, the items are returned to their respective default locations (e.g., a virtual picture frame is moved back to a virtual shelf from a virtual floor and a virtual car is returned to a virtual garage from a virtual river).

Figure 1:
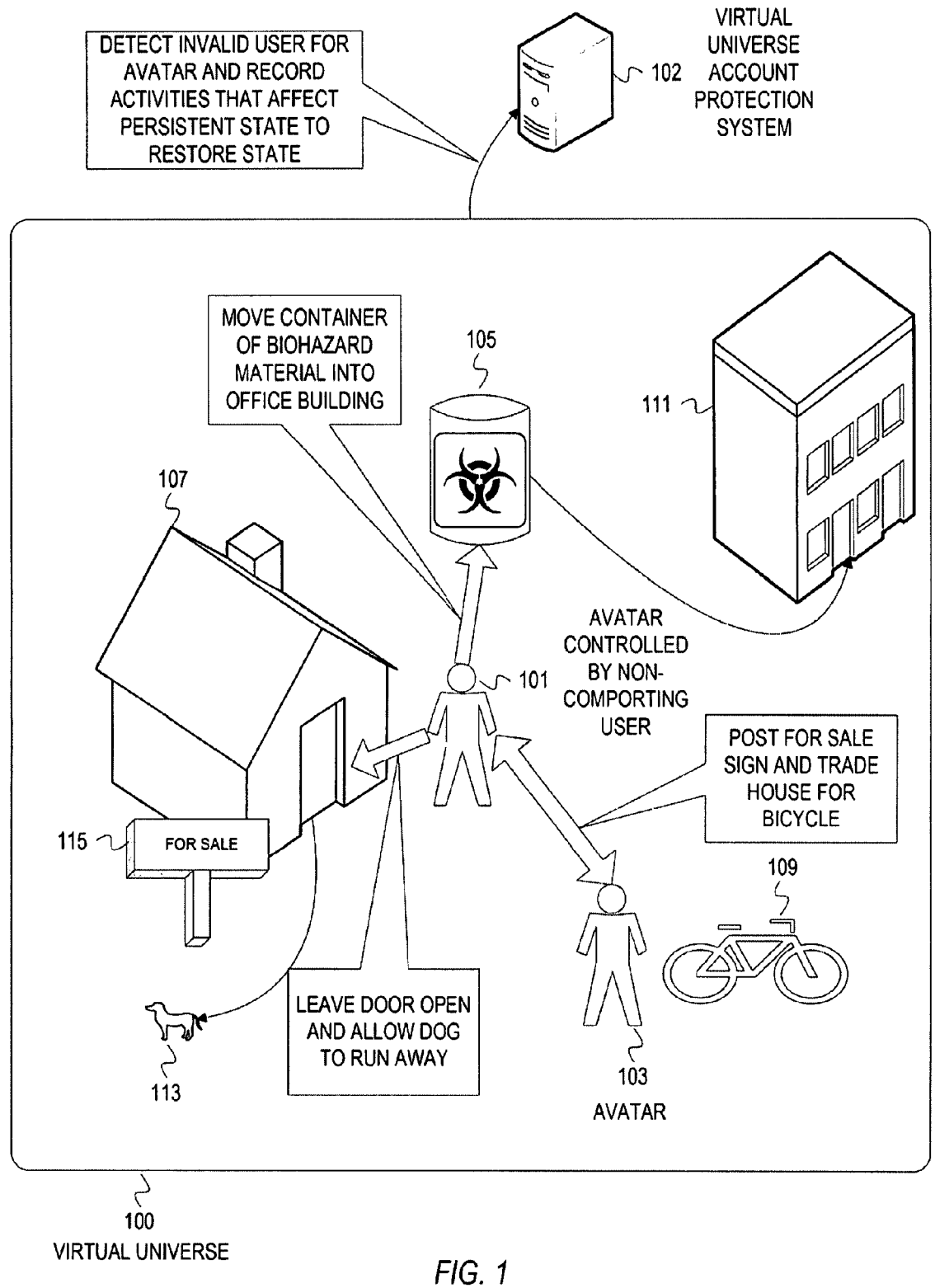
FIG. 1 depicts an example of a virtual protection account system detecting a non-comporting user and recording activities.

FIG. 1 depicts an example of a virtual protection account system detecting a non-comporting user and recording activities. In FIG. 1, a virtual universe 100 includes an avatar 101, an avatar 103, a house 107, a for sale sign 115, a dog 113, a bicycle 109, a building 111, and a container 105 of biohazard material. A virtual universe account protection system 102 detects that the avatar 101 is controlled by a non-comporting user. The virtual universe account protection system records activities of the avatar 101.

In the virtual universe 100, the avatar 100 moves the container 105 of biohazard material into the building 111. The avatar 101 leaves a door open to the house 107, allowing the dog 113 to exit the house 107. The avatar 101 then posts the for sale sign 115 for the house 107. The avatar 101 trades the house 107 to the avatar 103 for the bicycle 109. The virtual universe account protection system 102 can use a variety of techniques to record these activities. Examples of recording activities include recording an indication of request for an activity (e.g., recording input that leads to the activity, recording a command selected by a user that leads to the activity, etc.), recording an indication of the activity itself (e.g., recording an identifier for the activity), etc.

Figure 2:
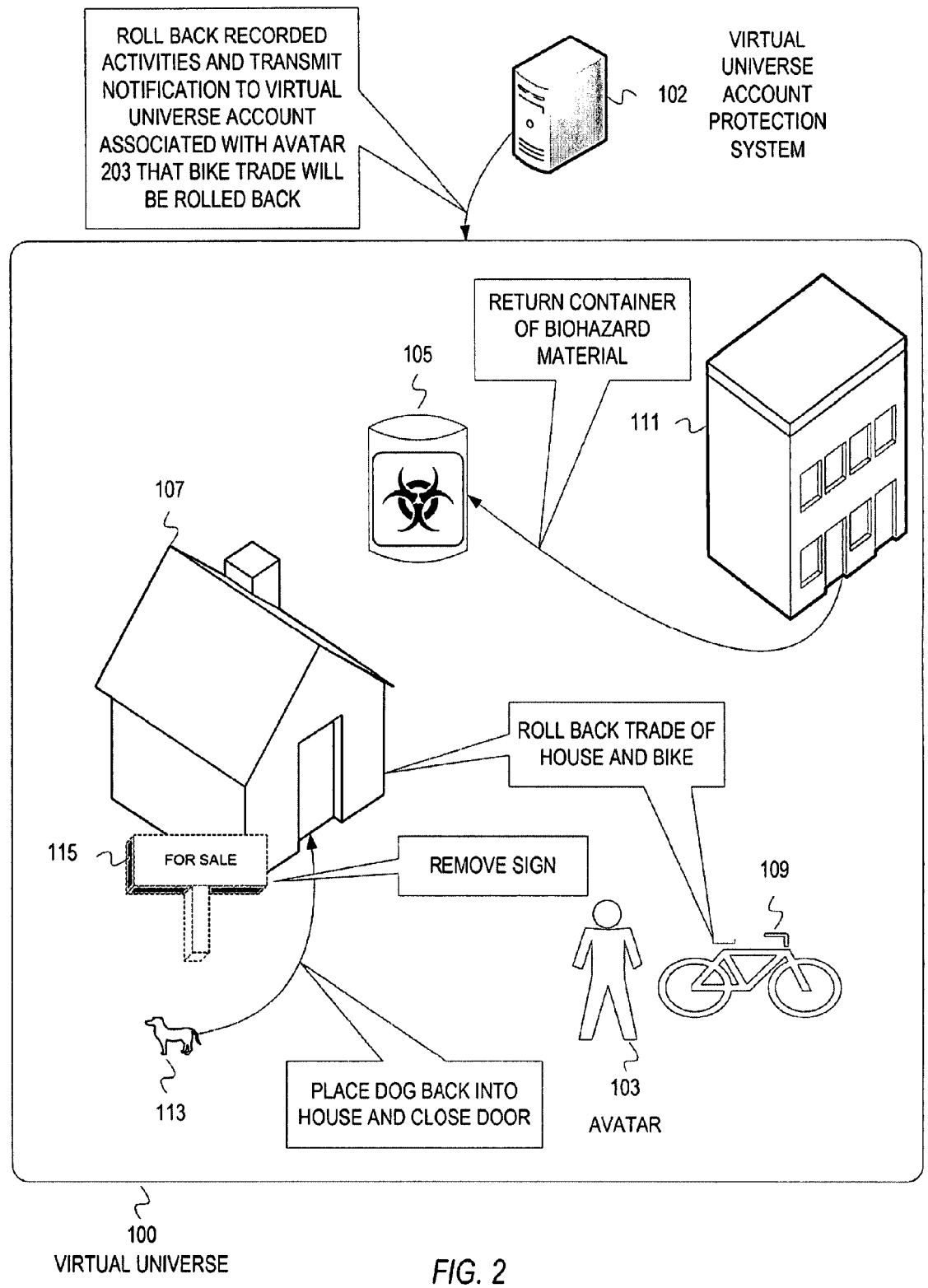
FIG. 2 depicts an example of a virtual universe account protection system rolling back activities to restore state of a virtual universe.

FIG. 2 depicts an example of a virtual universe account protection system rolling back activities to restore state of a virtual universe. In FIG. 2, the virtual universe 100 includes the avatar 103, the house 107, the for sale sign 115, the dog 113, the bicycle 109, the building 111, and the container 105 of biohazard material. The virtual universe account protection system 102 terminates the session of the non-comporting user and rolls back the recorded activities of the non-comporting user as implemented by the avatar 101. Rolling back of the recorded activities in FIG. 2, involves removing the container 105 of biohazard material from the building 111 and returning it to a location prior to the activity of the avatar

101. The dog 113 is returned to the house 107 as if the door had not been opened, and the door to the house 107 is closed. Finally, the for sale sign 115 is removed and the virtual universe account protection system 102 posts a notification to a virtual universe account associated with the avatar 103 to notify the owner/user that the trade of the bike 109 and the house will be rolled back because the transaction was tainted by a non-comporting user. Rolling back the trade of the house 107 and the bike 109 may comprise restoring indication of ownership of the bike 109 and the house 107. The avatar 103 may retrieve the bike after ownership is restored. The virtual universe account protection system 102 can return the bike 109 to a location prior to the trade or return the bike 109 to an inventory of the avatar 103.

As illustrated in FIGS. 1 and 2, a user that inappropriately uses a virtual universe account and/or avatar associated with the virtual universe can wreak havoc in the virtual universe. Although the example illustration depicted in FIG. 1 is limited to activities in the virtual universe, activities may not be within the virtual universe while still impacting a virtual universe account. Examples of activities that could be recorded and rolled back include logging off an avatar, changing settings of a virtual universe account, etc.

Figure 3:
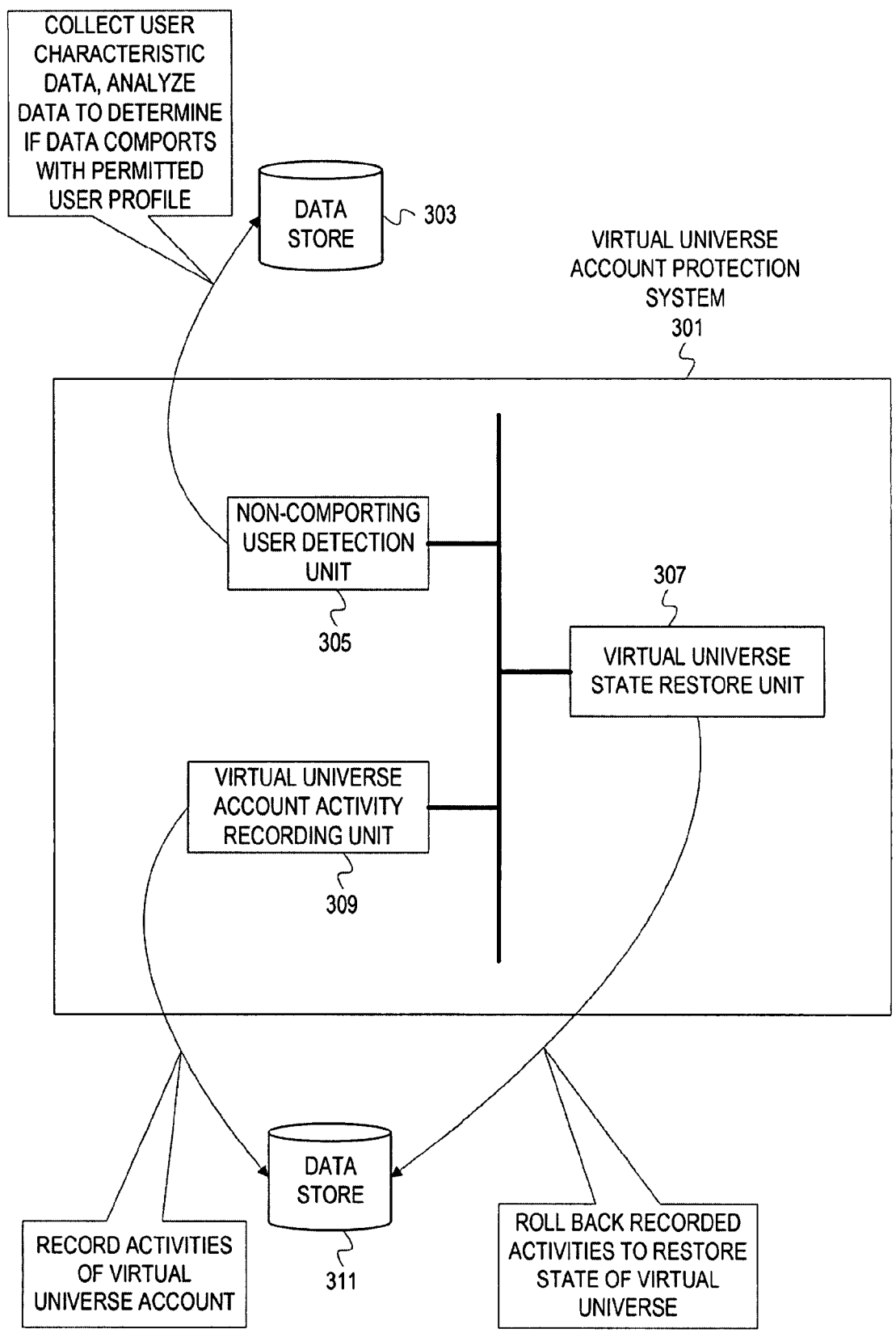
FIG. 3 depicts an example of a virtual universe account protection system.

FIG. 3 depicts an example of a virtual universe account protection system. A virtual universe account protection system 301 includes a non-comporting user detection unit 305, a virtual universe account activity recording unit 309, and a virtual universe state restore unit 307. The non-comporting user detection unit 305 collects user characteristic data and stores the collected user characteristic data in a data store 303. The data store 303 is depicted in FIG. 3 as being remote from the virtual universe account protection system 301, but may be local or distributed across both local and remote data stores. The non-comporting user detection unit 305 evaluates the data to determine if the collected data that represents one or more characteristics of a user comport with a permitted user profile.

The data collected can represent a variety of characteristics of a user and the collected data evaluated in accordance with a variety of techniques. Examples of data that represent one or more characteristics of a user include password, keystrokes, avatar navigation, object interaction data, mouse cursor related data, region data, communication method data, age data, biometric data, etc. Various examples for evaluating the data to determine one or more characteristics about the user to detect a non-comporting user include the following:

Alternate Passwords—A single account could be accessed using multiple passwords. Each password indicates a different user.

Key-stroke Recognition—Key-stroke data can be evaluated to discern different users.

Key-down time—The amount of time keys are held down can be evaluated to discern different users because users typically hold down different keys for distinct durations. For example, a user may usually hold down the "o" key for x milliseconds and the "k" key for z milliseconds. A permitted user profile for the virtual universe account indicates that a permitted user holds down the "o" and "k" keys for y milliseconds.

Inter-key delay—Inter-key delay data is evaluated to determine the delay between typing individual keys and key patterns.

Typing-rate—Typing rate data is evaluated to determine the words per minute typed by the user.

Numeric keypad usage—Numeric keypad usage data is evaluated to determine a user's preference of the keypad to the standard number keys.

Capitalization preferences—Capitalization data is evaluated to determine a user's preference to capitalize letters (e.g., use of Caps Lock, Left Shift, and Right Shift keys).\

Avatar Navigation—Data that represents avatar navigation is evaluated to determine avatar navigation characteristics, such as preference for keyboard or mouse based navigation. Fingerprint data (e.g. biometric signature) of the nature of avatar movements may be collected. The collected data indicates the ease with which a user navigates (e.g. economy of movement compared against back and forth jitter), and/or the nature of motions (e.g. 20% flying and 80% cursor-driven walking). This avatar navigation fingerprint data may be stored in a database and compared with current avatar navigation characteristics. For example, if an avatar is suddenly performing 80% flying and 20% walking instead of 80% walking and 20% flying, the avatar may be controlled by someone who is not the primary owner of the avatar and not one of the permitted or authorized users (i.e., a non-comporting user).

Object Interaction Delay—Data that indicates the average time for a user to hover over an object before interacting with it is evaluated.

Mouse Cursor—Data that indicates the user's interaction with the mouse cursor is evaluated against the permitted user profile to detect a non-comporting user. A user may have a preference for a steady mouse cursor or may "fidget" with the mouse cursor.

Region Preference—Data that indicates the regions a user commonly visits is evaluated against the permitted user profile.

Preferred Communication Method—Data is collected that indicates a user's preferred communication method (instant messaging, voice chat, etc).

Age Recognition—A user's "generation" or age may be discerned by analyzing the user's interaction with the virtual universe. Using specific words or acronyms may indicate a user's age. Additionally, word choice and word usage can be evaluated to discern the user's "generation" or age.

Biometric Recognition—A virtual universe account protection system may employ biometric identification such as detecting the size and weight of the hand used to control a mouse for virtual universe interactions.

The non-comporting user detection unit 205 can collect any one or more of the above types of data that represent user characteristics and detect a non-comporting user with any one of the above examples or a combination of the examples. The permitted user profile can be created based on data collected from the owner of the virtual universe account. The owner (or authorized user) can define an initial permitted user profile. This defined initial permitted user profile can be modified by the virtual universe account protection system. The virtual universe account protection system learns behavior and/or characteristic(s) of the particular user as represented by data and modifies, updates or creates a permitted user profile based on the learning.

The virtual universe account activity recording unit 309 records activities of a virtual user account (e.g., avatar movements and/or activities, changing account settings, etc.) into a data store 311. Although depicted as separate from the data store 303, the data store 311 and the data store 303 may be a same data store, in a same data store network, different data stores housed together, a component of the virtual universe account protection system 301, etc. The virtual universe account activity recording unit 309 can begin recording activities at in response various triggers or events. Examples of events include a logon event, a notification event (e.g., the non-comporting detection unit 305 notifies the virtual universe account activity recording unit 309 that confidence is high that the logged on user is a non-comporting user), a manual request is received from a virtual universe administrator, etc. Likewise, the virtual universe account activity recording unit 309 can stop recording in response to various events (e.g., logoff, memory shortage, manual override by an administrator, termination by a confirmed account owner, a special password trigger, etc.). In addition, the virtual universe account activity recording unit 309 may continuously record activities from logon to logoff or occurrence of a terminating event.

The virtual universe state restore unit 307 restores state by rolling back at least some of the recorded activities. The virtual universe state restore unit 307 performs operations to essentially undo activities or performs operations that negate recorded activities. The virtual universe state restore unit 307 is activated to restore state in response to various triggers, commands, messages, and/or events. Examples of such triggers or events include reaching a certain threshold of confidence that the user is non-comporting, log off of the non-comporting user, an alert from a virtual universe administrator to restore state because of strong suspicions that the account has been misappropriated, etc. The restoring of state may occur as an ultimate set of one or more operations (e.g., restore state after booting a non-comporting user), may occur periodically (e.g., roll back activities after a certain time period while recording is ongoing, roll back activities after a certain number of activities have been recorded, etc.). The virtual universe state restore unit 307 may also generate and post notifications to virtual universe accounts affected by the activities of a non-comporting user. In addition, the virtual universe account activity recording unit 309 and the virtual universe state restore unit 307 may operate on a buffer. For instance, the recording unit 309 records activities into a buffer, which is drained by the restore unit 307 when the buffers full, when the buffer is half full, after a period of time of recording, when a given number of activities have been recorded, etc. The particular parameter(s) that controls restore and recording (e.g., buffer size) can be selected, perhaps purchased, by users.

As stated, the virtual universe account protection system depicted in FIG. 3 is an example. The units can be merged or divided into other unites (e.g., the virtual universe account state restore unit 307 may be decomposed into an affected account notification unit and a roll back unit). In addition, the units may be implemented as hardware, software, or both hardware and software.

Figure 4:
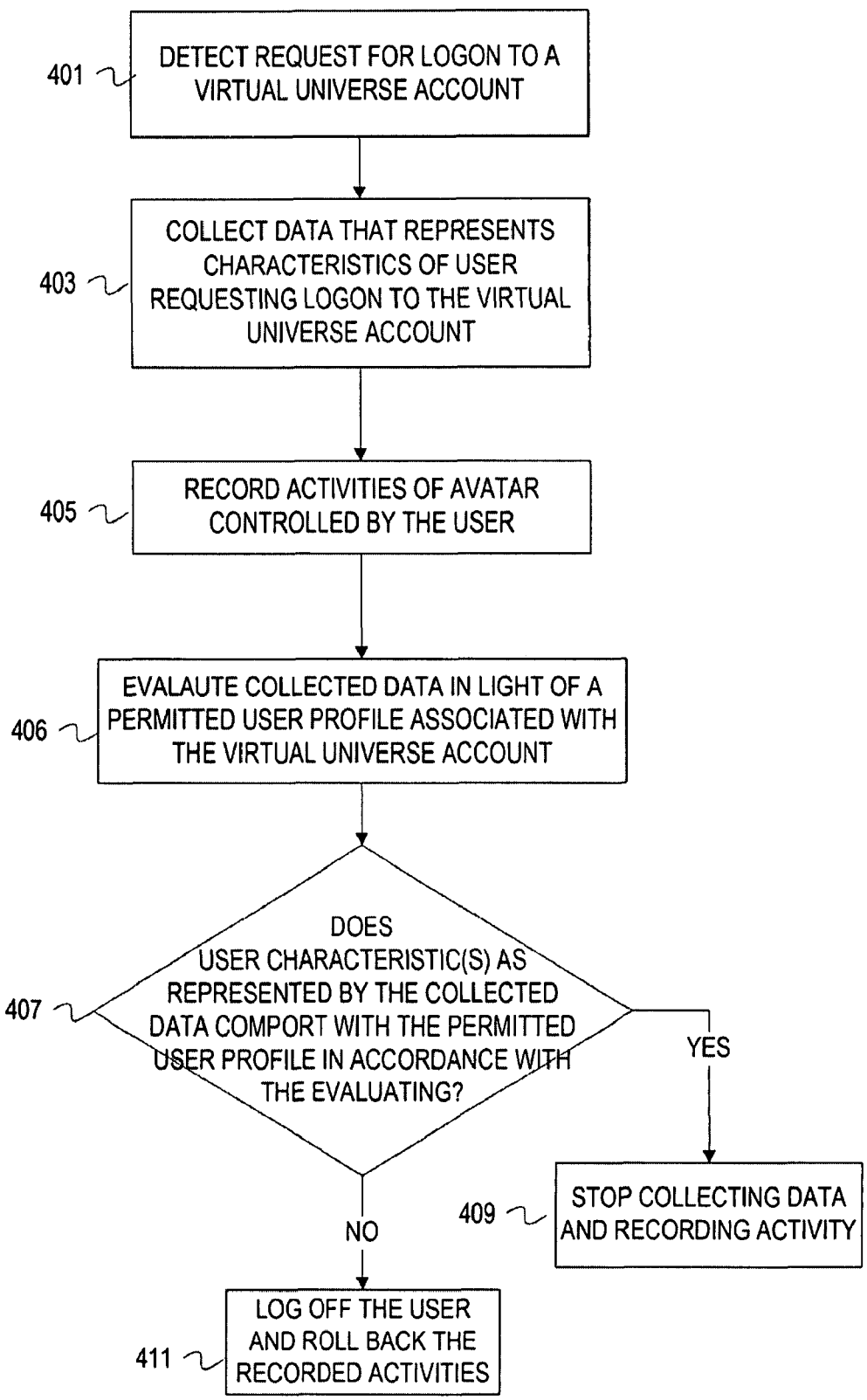
FIG. 4 depicts a flowchart of example operations to collect data.

FIG. 4 depicts a flowchart of example operations to collect data. At block 401, a request for logon to a virtual universe account is detected. At block 403, data that represents one or more characteristics of the user requesting the logon are collected. At block 405, activities of an avatar controlled by the logged on user are recorded. At block 406, the collected data is evaluated against a permitted user profile associated with the virtual user account. At block 407, it is determined if the user characteristic(s), as represented by the collected data, comports with the permitted user profile in accordance with the evaluating. If the user characteristic(s) fails to comport with the permitted user profile, then control flows to block 411. If the user characteristic(s) comports with the permitted user profile, then control flows to block 409.

At block 409, the collecting of the data and the recording of activities are stopped.

At block 411, the user is logged off and the recorded activities are rolled back.

The operations depicted in FIG. 4 are example operations. Embodiments may perform operations differently, perform additional operations, or not perform some of the operations. For example, a notification may be sent in addition or instead of logging off the user once it is determined that the user characteristic data does not comport with the permitted user profile. As another example, failure to comport with the permitted user profile can be measured or tracked in degrees of confidence. For instance, a possible non-comporting user is determined based on key-stroke recognition data. When this first level of non-comporting characteristic(s) is determined, activities are recorded. If confidence reaches or passes a particular confidence threshold, then the user is logged off and the recorded activities are rolled back. Confidence that a user is a non-comporting can increase based on avatar navigation data and age data, for example.

Figure 5:
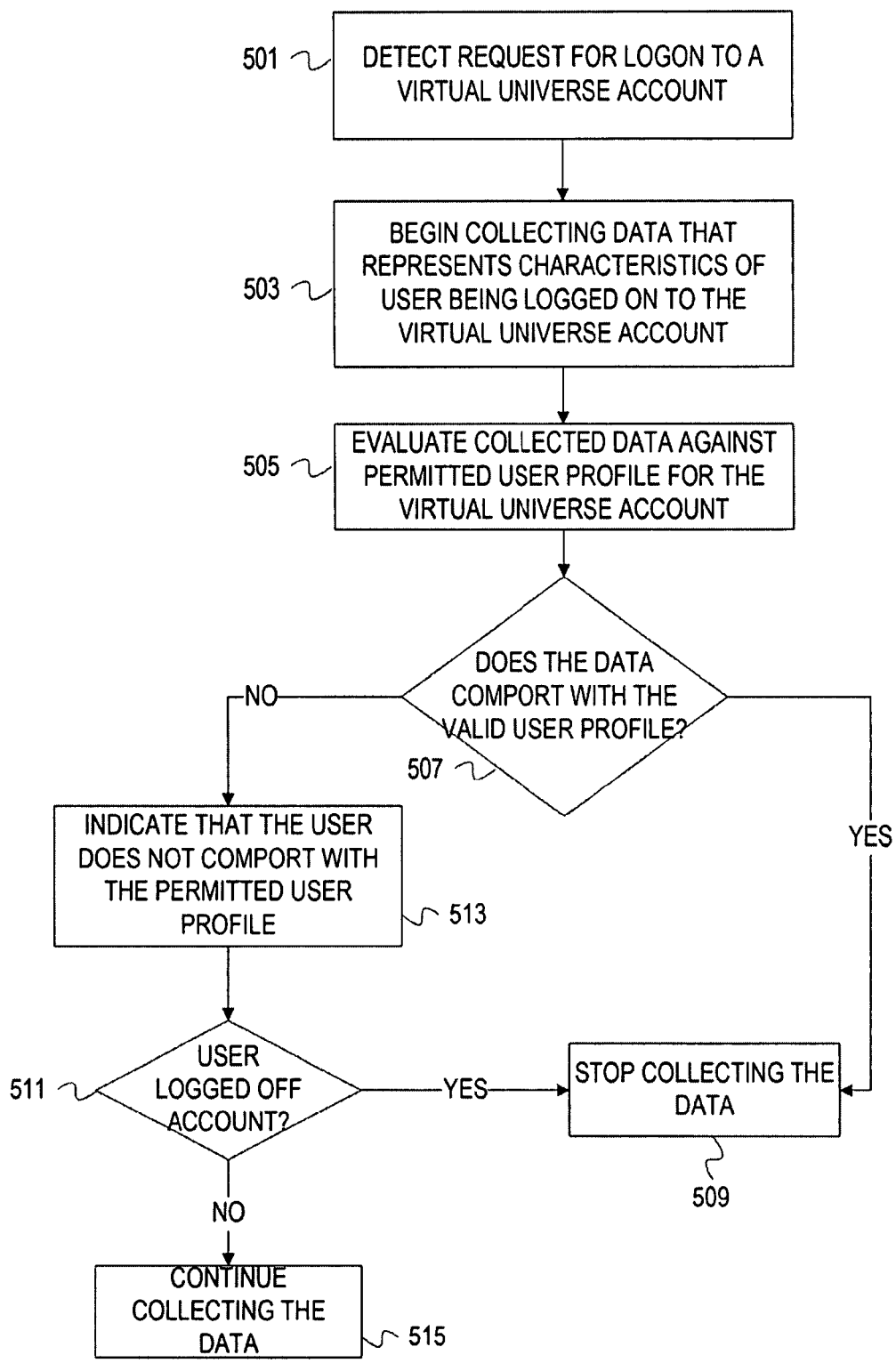
FIG. 5 depicts a flowchart of example operations for collecting characteristic(s) data without logging off a user.

FIG. 5 depicts a flowchart of example operations for collecting characteristic(s) data without logging off a user. At block 501, a request for a user to logon to a virtual universe account is detected. At block 503, collection of data begins. The data being collected represents one or more characteristic(s) of the user logging on to the virtual universe account. At block 505, the collected data is evaluated against a permitted user profile associated with the virtual universe account. At block 507, it is determined if the user characteristic(s) as represented by the collected data comports with the permitted user profile. If the user characteristic(s) as represented by the collected data comports with the permitted user profile, then control flows to block 509. Otherwise, control flows to block 513.

At block 509, the collecting of the data is stopped.

At block 513, it is indicated that the user characteristic(s) as represented by the collected data does not comport with the permitted user profile. For example, a message is transmitted to an administrator, a message is transmitted to a roll back process or unit, a flag is set, etc. At block 511 it is determined if the user has logged off. If the user has logged off, then control flows to block 509. If the user has not logged off, then data collection continues at block 515. The data collection may continue to have greater confidence that the user is a non-comporting user, build a database of characteristics of non-comporting users, etc.

Figure 6:
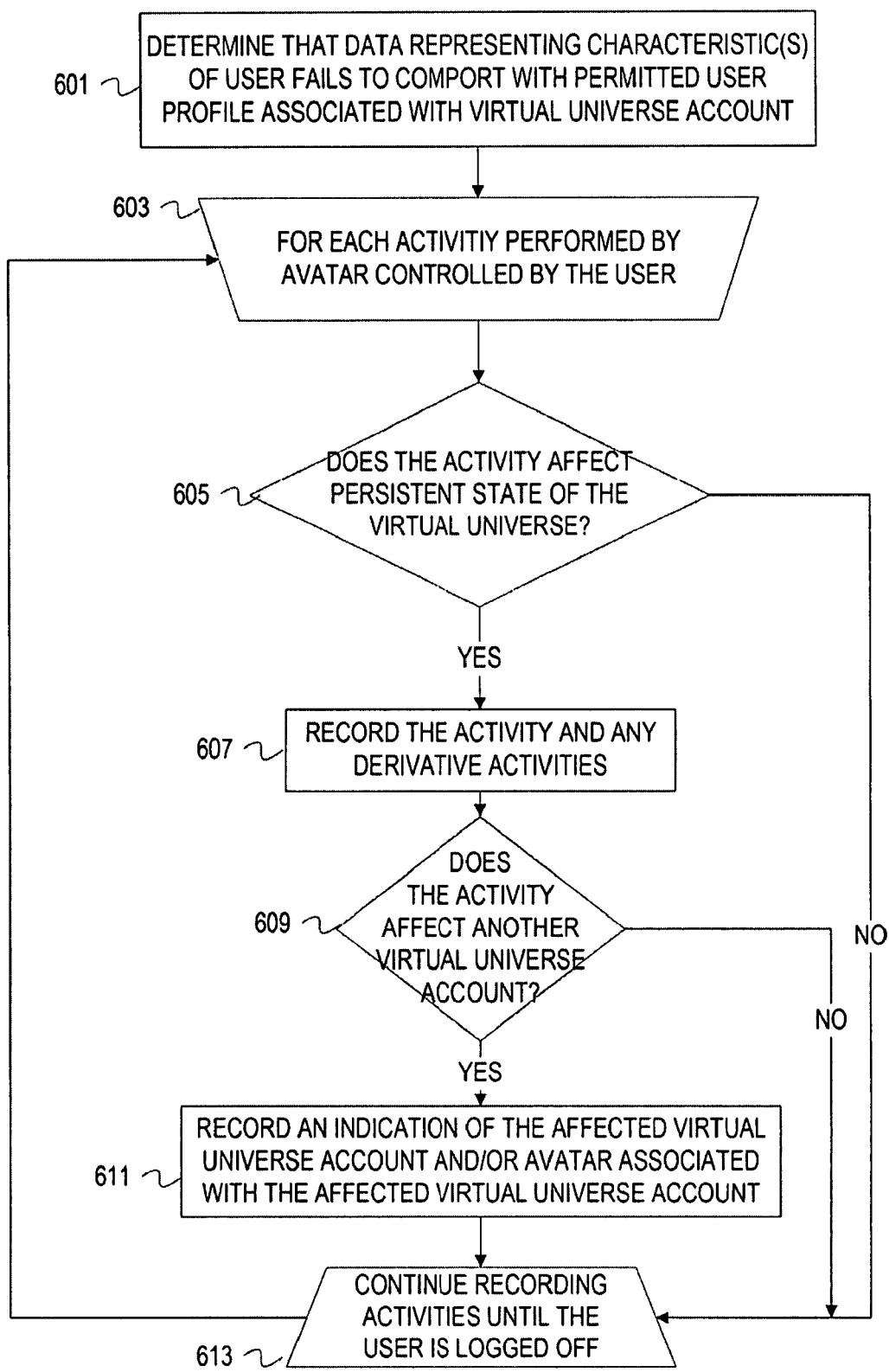
FIG. 6 depicts a flowchart of example operations for recording activities of a non-comporting user or possibly non-comporting user.

FIG. 6 depicts a flowchart of example operations for recording activities of a non-comporting user or possibly non-comporting user. At block 601, it is determined that data representing one or more characteristic(s) of a user fails to comport with a permitted user profile associated with a virtual universe account. At block 603, a loop of operations represented by blocks 605, 607, 609, and 611 begin for each activity performed by an avatar associated with the virtual universe account and controlled by the user. At block 605, it is determined if the activity affects persistent state of the virtual universe. For example, lifting a hair that drops back to the same place is not recorded while cutting the hair is recorded. If the activity affects persistent state, then control flows to block 607. If the activity does not affect persistent state, then control flows to block 613.

At block 607, the activity and any derivative activities are recorded. Referring to FIG. 1 as an example, the activity of opening the door to the house is recorded and the derivative activities of the dog escaping are also recorded. At block 609, it is determined if the recorded activity affects another virtual universe account. For example, burning someone else's house down or purchasing an item from an avatar associated with another virtual universe account affects another virtual universe account. If the activity does not affect another virtual universe account, then control flows to block 613. If the activity does affect another virtual universe account, then control flows to block 611.

At block 611, an indication of the affected virtual universe account and/or avatar associated with the affected virtual universe account is recorded (e.g., name of the avatar, UUID of the avatar, name of registered owner of the account, etc.). Additional information may also be recorded to help identify and/or roll back the activity. Examples of other information include location of the activity, time of the activity, value of the activity, etc.

Embodiments may perform additional and/or different operations than those depicted in FIG. 6 to record activities. For example, an additional evaluation may be performed in case an activity does not affect persistent state but does affect another virtual universe account. Recording operations may be performed with an interrupt or post type mechanism instead of a looping monitoring mechanism as may be interpreted from FIG. 6.

A virtual universe account protection system can also be used to implement a limited use mode for a virtual universe account. While a limited use mode is activated, requests for performance of activities by an authorized user are monitored. Certain activities are prohibited in accordance with a policy defined by an owner/agent of the virtual universe account. When the limited use mode is deactivated, activities performed by the authorized user/avatar during the limited use mode that affect persistent state of the virtual universe are rolled back. With limited use mode, an owner/agent of a virtual universe account can permit trial use of an avatar associated with the virtual universe account, renting of an avatar, etc.

Figure 7:
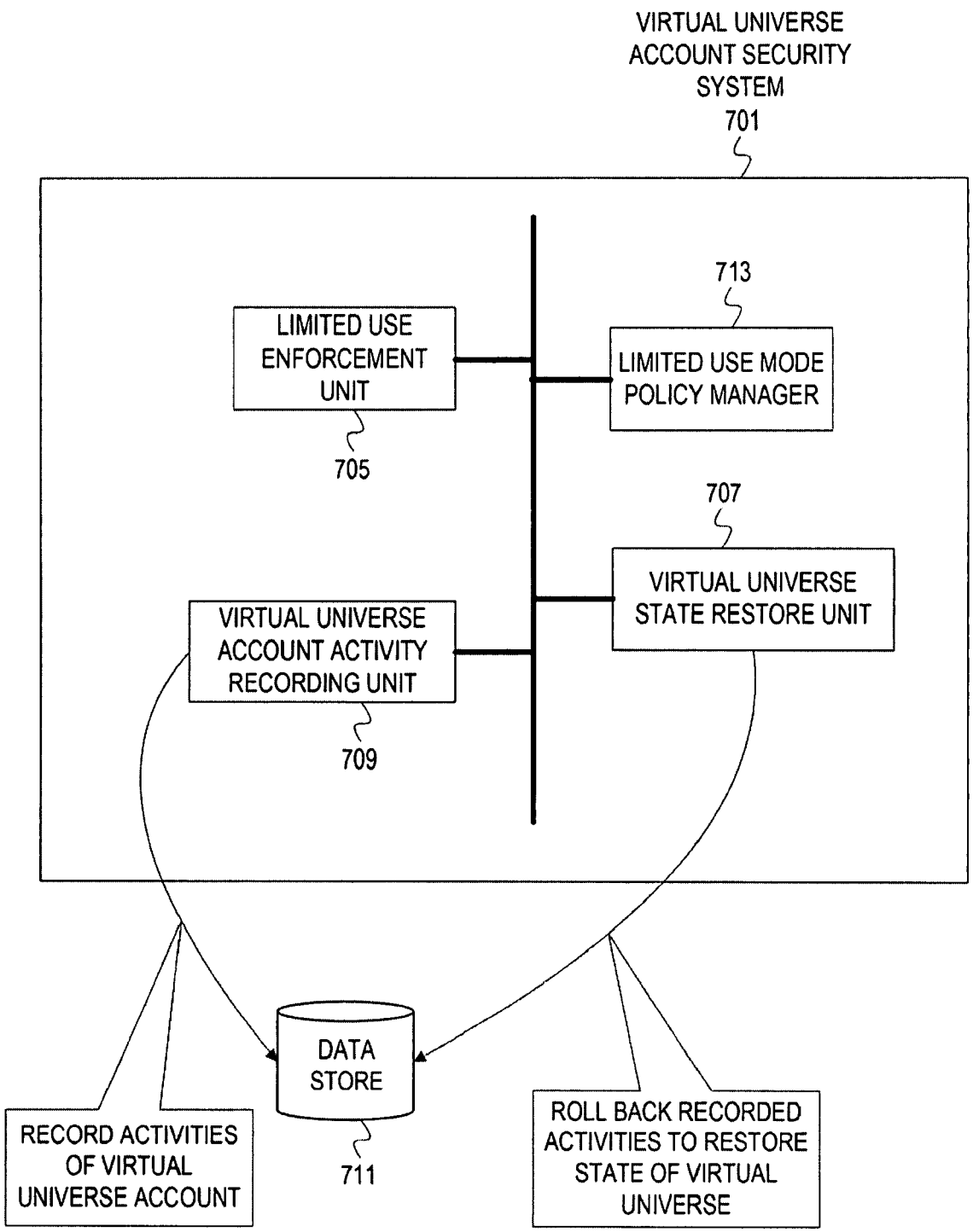
FIG. 7 depicts an example virtual universe account protection system that can implement limited use mode.

FIG. 7 depicts an example virtual universe account protection system that can implement limited use mode. A virtual universe account protection system 701 includes a limited use enforcement unit 705, a limited use mode policy manager 713, a virtual universe account activity recording unit 709, and a virtual universe state restore unit 707. The virtual universe account protection system 701 can be implemented as hardware, software, hardware and software, at a client, at a server, at both a client and a server, etc. An owner/agent of a virtual universe account defines a policy for limited use mode with the limited use mode policy manager 713. The limited use mode policy manager 713 presents a user with activities. The user can selected individual activities or types of activities to be prohibited during limited use mode or to be exclusively allowed during limited use mode. A user can also select pre-defined policies for certain types of limited use. For example, a pre-defined policy may be tailored for renting an avatar while another pre-defined policy is tailored to allowing children to use a parent's virtual universe account. After a policy has been created and/or selected, the limited use mode policy manager 713 associates the policy with the virtual universe account and stores the policy. When a limited use mode is activated, the limited use mode policy manager 713 indicates to the limited use enforcement unit 705 the one or more policies to apply. The limited use mode policy manager 713 determines the one or more policies to be applied based any one or more of configurations, settings on the account for limited use mode, user selection, guest name, etc.

The limited use enforcement unit 705 monitors activities by an avatar and/or authorized use while limited use mode is activated. The limited use enforcement unit 705 applies the one or more policies indicated by the limited use mode policy manager 713 by ensuring that activities adhere to the one or more policies (e.g., ensure that the indicated activities are not performed or that only the indicated activities are performed). The limited use enforcement unit 705 can monitor the user with different techniques. Examples of techniques include monitoring input from the user at a client rendering the virtual universe, monitoring commands from the user received at a server that implements the virtual universe, etc. In addition, the limited use enforcement unit 705 can inform the user as to why an activity has been blocked. The limited use enforcement unit 705 can block activities by preventing transmission of requests from the client to a server, blocking processing of requests, etc.

Once limited use mode is activated, the virtual universe account activity recording unit 709 begins recording activities. The recording unit 709 records the activities to a data store 711. The data store 711 can be another unit of the virtual universe account protection system 701, a remote store, multiple distributed stores, etc. The virtual universe account activity recording unit 709 terminates recording in response to deactivation of the limited use mode.

The virtual universe state restore unit 707 rolls back the activities recorded during the limited use mode to restore state of the virtual universe for the virtual universe account. The virtual universe state restore unit 707 may be triggered by a user attempting to exit of log off while limited use mode is still active. The virtual universe restore unit 707 (or another unit) could require a password to be entered prior to exiting. If the password is not provided, then the recorded activities are rolled back. If the password is provided (e.g., a parent wants the activities of a child to persist), then the activities are not rolled back, and perhaps purged from the data store. Embodiments may also copy the recorded activities to create a new virtual universe account consistent with state resulting from the activities of the authorized user. For example, a child or renter may decide to begin using their own virtual universe account. A new virtual universe account would be created based on the trial or rented avatar. The recorded activities could then be played for the new account to create a state consistent with last trial or rented use.

Figure 8:
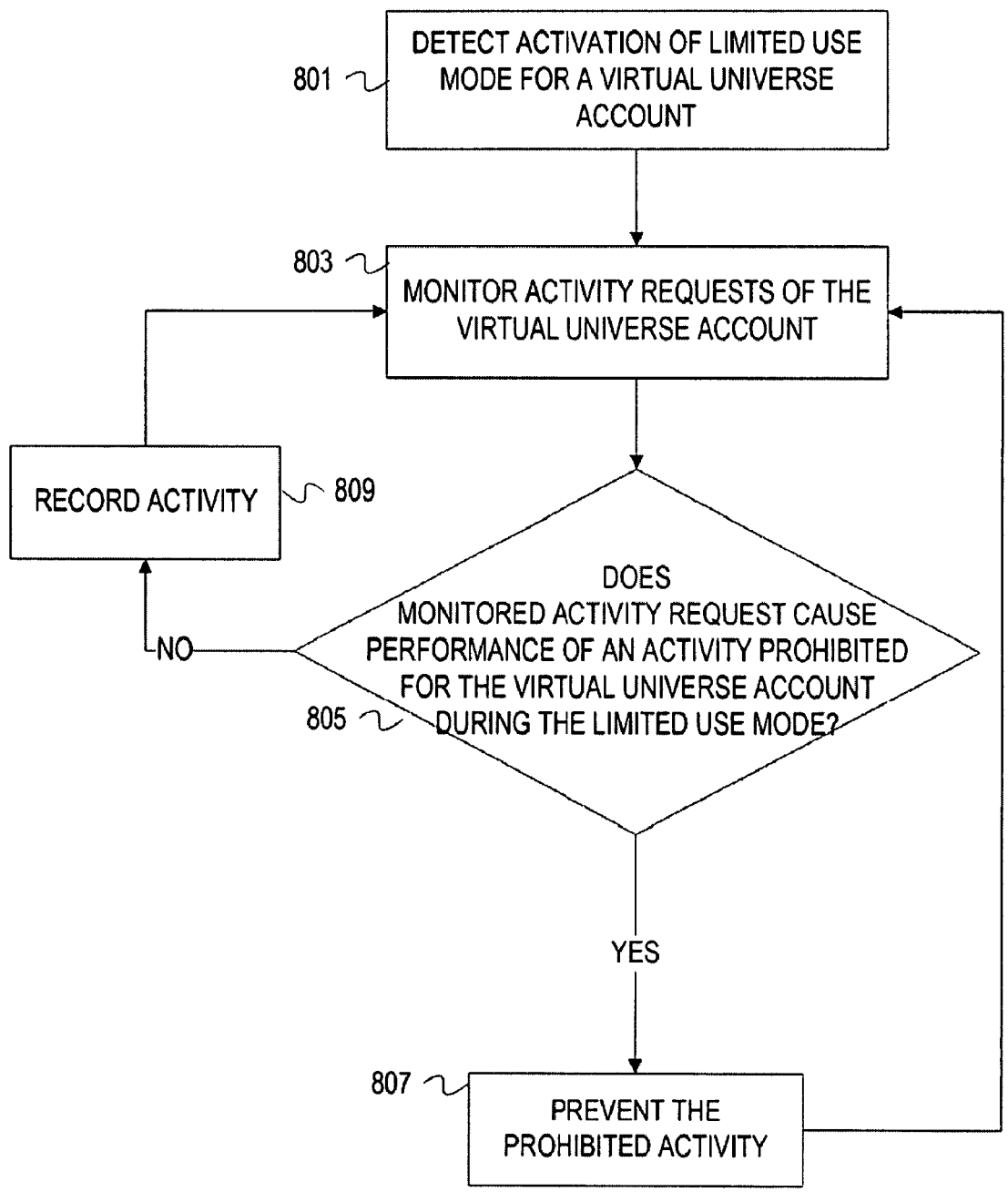
FIG. 8 depicts a flowchart of example operations for applying a policy for limited use mode of a virtual universe account.

FIG. 8 depicts a flowchart of example operations for applying a policy for limited use mode of a virtual universe account. At block 801, activation of limited use mode for a virtual universe account is detected. At block 803, activity requests of the virtual universe account are monitored. For example, commands received at a server of the virtual universe are evaluated against a list of prohibited commands indicated in the limited use mode policy. At block 805, it is determined if the monitored activity request will cause performance of an activity prohibited for the virtual universe account during limited use mode of the account. If the activity request will cause performance of a prohibited activity, then control flows to block 807. If the activity request will not cause performance of a prohibited activity, then control flows to block 809.

At block 807, the prohibited activity is prevented (e.g., the request message is discarded, the message is proceed and then recorded as a blocked activity and not passed to a rendering engine, etc.). Control flows from block 807 back to block 803.

At block 809, the activity is recorded.

As stated, the operations depicted in FIG. 8 are example operations. Additional operations may be performed to evaluate each activity to determine whether the activity affects persistent state prior to recording the activity. Additional operations may be performed to inform a user that an activity violates the limited use mode policy for the virtual universe account. In addition, embodiments may block access to external options and/or messages (e.g., teleport invitations) in addition to or instead of blocking activities. Embodiments may also modify a value or setting to prevent activities from having an effect on persistent state (e.g., changing a value or option so that objects cannot be moved, deleted, ownership changed, etc.).

The described embodiments may be provided as a computer program product, or software, that may include a machine-readable medium having stored thereon instructions, which may be used to program a computer system (or other electronic device(s)) to perform a process according to embodiments of the invention(s), whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Figure 9:
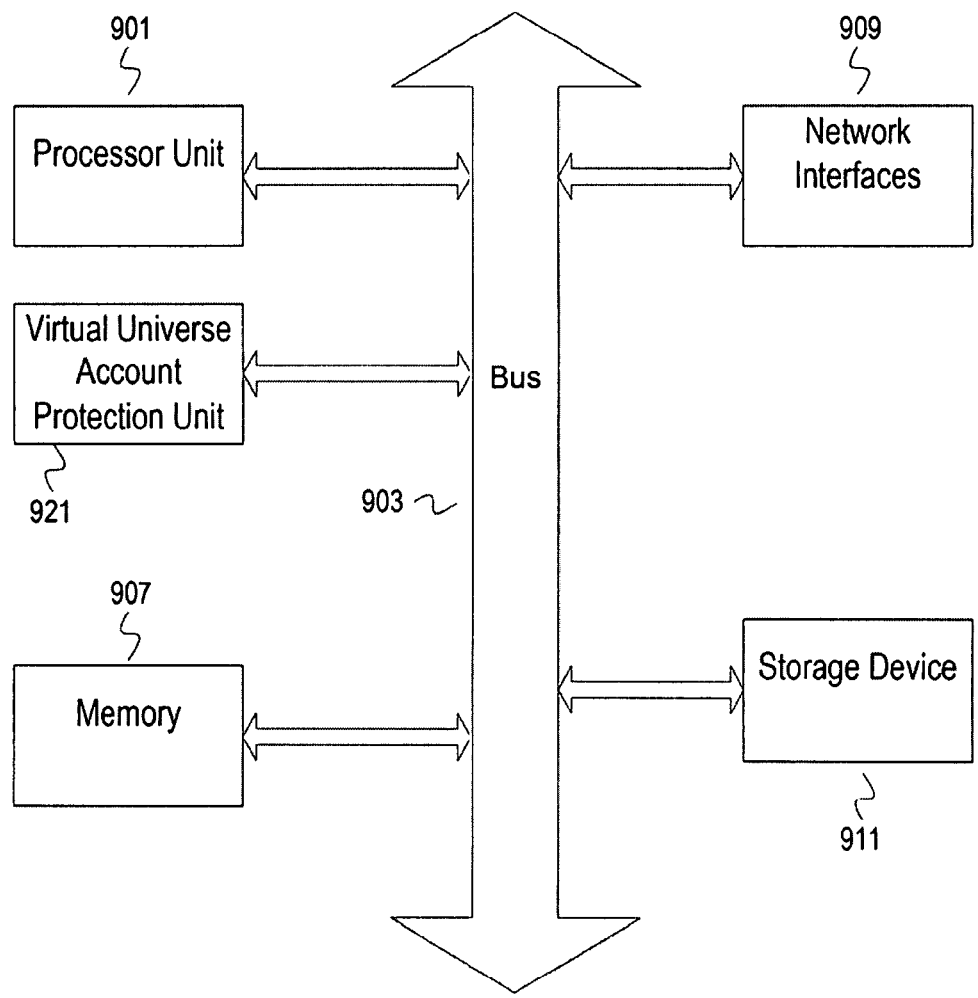
FIG. 9 depicts an example computer system.

FIG. 9 depicts an example computer system. A computer system includes a processor unit 901 (possibly including multiple processors, multiple cores, multiple nodes, and/or implementing multi-threading, etc.). The computer system includes memory 907. The memory 907 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 903 (e.g., PCI, ISA, PCI-Express, HyperTransport®, InfiniBand®, NuBus, etc.), a network interface 905 (e.g., an ATM interface, an Ethernet interface, a Frame Relay interface, SONET interface, wireless interface, etc.), and a storage device(s) 909 (e.g., optical storage, magnetic storage, etc.). The computer system also includes a virtual universe account protection unit 921 to implement embodiments described above. The virtual universe account protection unit 921 includes one or more functionalities that facilitate protecting a virtual universe account against a non-comporting user and/or limited use mode for a virtual universe account. Any one of the functionalities for the embodiments may be partially (or entirely) implemented in hardware, such as the virtual universe account protection unit 921 and/or on the processing unit 901. For example, the functionality may be implemented with an application specific integrated circuit, in logic implemented in the processing unit 901, in a co-processor on a peripheral device or card, etc. Embodiments may also be partially or entirely implemented in program product that is embodied in any one or more of the memory 907, the storage device(s) 909, a remote store not depicted, etc. Further, realizations may include fewer or additional components not illustrated in FIG. 9 (e.g., video cards, audio cards, additional network interfaces, peripheral devices, etc.). The processor unit 901, the storage device(s) 909, and the network interface 905 are coupled to the bus 903. Although illustrated as being coupled to the bus 903, the memory 907 may be coupled to the processor unit 901.

While the embodiments are described with reference to various implementations and exploitations, it will be understood that these embodiments are illustrative and that the scope of the invention(s) is not limited to them. In general, techniques for protecting a virtual universe account as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A method virtual universe account protection, the method comprising the steps of:
   a computer collecting data representing one or more characteristics of a user controlling an avatar in a virtual universe, wherein the data representing the one or more characteristics comprises at least one of avatar navigation in the virtual universe, and object interaction data in the virtual universe;
   the computer evaluating the collected data against a permitted user profile associated with a virtual universe account associated with the avatar;
   the computer determining that the collected data represents one or more characteristics that do not comport with the permitted user profile based, at least in part, on said evaluating the collected data against the permitted user profile;
   the computer recording one or more activities performed by the avatar that modify persistent state of the virtual universe at least with respect to the avatar, wherein the one or more activities comprise an activity in the virtual universe that impacts a reputation of a virtual universe account associated with the avatar, an activity that destroys property in the virtual universe, and an activity that reduces a value of the virtual universe account associated with the avatar; and
   the computer rolling back the recorded one or more activities to restore the virtual universe to a state prior to the recorded one or more activities responsive to said determining that the collected data represents one or more characteristics that do not comport with the permitted user profile.

2. The method of claim 1, wherein said recording the one or more activities performed by the avatar that modify persistent state of the virtual universe at least with respect to the avatar occurs coincident with the user logging on to the virtual universe account, occurs before said determining that the collected data represents one or more characteristics that do not comport with the permitted user profile, or occurs in response to said determining that the collected data represents one or more characteristics that do not comport with the permitted user profile.

3. The method of claim 1, wherein the one or more activities comprise moving one or more items from respective default locations, and wherein the computer rolling back the recorded one or more activities comprises returning the one or more items to the respective default locations.

4. The method of claim 3, wherein said recording occurs continuously while the user controls the avatar and said rolling back occurs periodically while the user controls the avatar.

5. The method of claim 1 further comprising:
the computer maintaining a confidence value for the collected data, wherein the confidence value represents confidence that the user controlling the avatar is using the avatar improperly,
wherein said determining that the collected data represents one or more characteristics that do not comport with the permitted user profile is based, at least in part on the confidence value, and
wherein said evaluating the collected data against the permitted user profile comprises at least one of,
evaluating an entered password against a list of one or more alternate passwords indicated in the user profile,
evaluating key stroke recognition data of the collected data with key stroke recognition data associated with the user profile,
evaluating avatar navigation data of the collected data with avatar navigation data associated with the user profile,
evaluating preferred communication method data of the collected data against preferred communication method data associated with the user profile,
evaluating region preference data of the collected data against region preference data associated with the user profile, and
evaluating age recognition data of the collected data against age recognition data associated with the user profile.

6. The method of claim 5, wherein said rolling back occurs in response to the confidence value reaching a threshold.

7. The method of claim 1, wherein said rolling back occurs in response to the user logging off the virtual universe account.

8. The method of claim 1 further comprising:
the computer determining that said rolling back involves a second avatar in the virtual universe; and
the computer notifying the second avatar that those of the recorded activities that involve the second avatar will be rolled back.

9. The method of claim 1, wherein the recorded one or more activities include an activity that affects a second virtual universe account, the method further comprising:
the computer recording an indication of the second virtual universe account; and
the computer transmitting a request to the second virtual universe account, the request requesting acquiescence to roll back the activity that affects the second virtual universe account or requesting an alternate resolution that addresses the activity that affects the second virtual universe account.

10. A method comprising:
a computer detecting activation of a limited use mode for a virtual universe account by evaluating collected data against a permitted user profile associated with said virtual universe account associated with an avatar, wherein the collected data represents one or more characteristics of a user controlling the avatar in a virtual universe, wherein the collected data comprises at least one of avatar navigation in the virtual universe, and object interaction data in the virtual universe;
while the limited use mode is activated, the computer monitoring activity requests for an avatar associated with the virtual universe account by recording one or more activities performed by the avatar that modify persistent state of the virtual universe at least with respect to the avatar, wherein the one or more activities comprise an activity in the virtual universe that impacts a reputation of a virtual universe account associated with the avatar, an activity that destroys property in the virtual universe, and an activity that reduces a value of the virtual universe account associated with the avatar;
the computer preventing performance of an activity that would stem from at least one of the monitored activity requests, wherein the activity is indicated as prohibited for the virtual universe account while the limited use mode is activated after determining that the collected data represents one or more characteristics that do not comport with the permitted user profile; and
the computer rolling back the recorded one or more activities to restore the virtual universe to a state prior to the recorded one or more activities responsive to said determining that the collected data represents one or more characteristics that do not comport with the permitted user profile.

11. The method of claim 10 further comprising:
the computer recording data that represents permitted activities performed during the limited use mode; and
the computer rolling back the recorded activities after the limited use mode is deactivated for the virtual universe account.

12. The method of claim 11 further comprising:
the computer creating a new virtual universe account based on the virtual universe account; and
the computer performing the recorded activities to set state for the new virtual universe account.

13. The method of claim 10, wherein the recorded activities comprise activities that affect persistent state of a virtual universe, wherein the computer monitoring activity requests for the avatar associated with the virtual universe account while the limited use mode is activated comprises the computer monitoring the activity requests in accordance with a policy that indicates at least one of individual activities and types of activities prohibited while the limited use mode is activated.

14. A program product for virtual universe account protection, the computer program product comprising:
one or more computer-readable, tangible storage devices;
program instructions, stored on at least one of the one or more storage devices, to collect data representing one or more characteristics of a user controlling an avatar in a virtual universe, wherein the data representing the one or more characteristics comprises at least one of avatar navigation in the virtual universe, and object interaction data in the virtual universe;
program instructions, stored on at least one of the one or more storage devices, to evaluate the collected data against a permitted user profile associated with a virtual universe account associated with the avatar;
program instructions, stored on at least one of the one or more storage devices, to determine whether the collected data represents one or more characteristics that do not comport with the permitted user profile based, at least in part, on evaluation of the collected data with the permitted user profile;
program instructions, stored on at least one of the one or more storage devices, to record one or more activities by the avatar that modify persistent state of the virtual universe at least with respect to the avatar, wherein the one or more activities comprise an activity in the virtual universe that impacts a reputation of a virtual universe account associated with the avatar, an activity that destroys property in the virtual universe, and an activity that reduces a value of the virtual universe account associated with the avatar; and program instructions, stored on at least one of the one or more storage devices, to roll back the recorded one or more activities to restore the virtual universe to a state prior to the recorded one or more activities responsive to a determination that the collected data represents one or more characteristics that do not comport with the permitted user profile.

15. The computer program product of claim 14, further comprising:

program instructions, stored on at least one of the one or more storage devices, to maintain a confidence value for the collected data, wherein the confidence value represents confidence that the user controlling the avatar is using the avatar improperly, wherein the program instructions to determine whether the collected data represents one or more characteristics that do not comport with the permitted user profile use the confidence value, wherein the program instructions to evaluate the collected data with the permitted user profile comprises at least one of, program instructions to evaluate an entered password against a list of alternate password indicated in the user profile, program instructions to evaluate key stroke recognition data of the collected data with key stroke recognition data associated with the user profile, program instructions to evaluate avatar navigation data of the collected data with avatar navigation data associated with the user profile, program instructions to evaluate preferred communication data of the collected data with preferred communication data associated with the user profile, program instructions to evaluate region preference data of the collected data with region preference data associated with the user profile, and program instructions to evaluate age recognition data of the collected data with age recognition data associated with the user profile.

16. The computer program product of claim 14, wherein the one or more activities comprise moving one or more items from respective default locations, wherein the program instructions to roll back the recorded one or more activities comprises program instructions to return the one or more items to the respective default locations.

17. The computer program product of claim 14, further comprising:

program instructions, stored on at least one of the one or more storage devices, to determine that rolling back involves a second avatar in the virtual universe; and program instructions, stored on at least one of the one or more storage devices, to notify the second avatar that those of the recorded activities that involve the second avatar will be rolled back.

18. A computer system for virtual universe account protection, the computer system comprising:

one or more processors, one or more computer-readable memories and one or more computer-readable, tangible storage devices;

program instructions, stored on at least one of the one or more storage devices for execution by at least one of the one or more processors via at least one of the one or more memories, to collect data that represents one or more characteristics of a user controlling an avatar in a virtual universe, wherein the data that represents the one or more characteristics comprises at least one of avatar navigation in the virtual universe, and object interaction data in the virtual universe;

program instructions, stored on at least one of the one or more storage devices for execution by at least one of the one or more processors via at least one of the one or more memories, to determine if the one or more characteristics as represented by the collected data comports with a permitted user profile associated with the virtual universe account;

program instructions, stored on at least one of the one or more storage devices for execution by at least one of the one or more processors via at least one of the one or more memories, to determine activities of the user that modify persistent state of the virtual universe at least with respect to the avatar and to determine activities of the user that do not modify persistent state of the virtual universe at least with respect to the avatar, wherein the activities that modify the persistent state of the virtual universe comprise an activity in the virtual universe that impacts a reputation of a virtual universe account associated with the avatar, an activity that destroys property in the virtual universe, and an activity that reduces a value of the virtual universe account associated with the avatar;

program instructions, stored on at least one of the one or more storage devices for execution by at least one of the one or more processors via at least one of the one or more memories, to record the activities that modify the persistent state; and program instructions, stored on at least one of the one or more storage devices for execution by at least one of the one or more processors via at least one of the one or more memories, to roll back the recorded activities if the one or more characteristics as represented by the collected data is determined to not comport with the permitted user profile.

19. The computer system of claim 18 further comprising:

program instructions, stored on at least one of the one or more storage devices for execution by at least one of the one or more processors via at least one of the one or more memories, to create a policy that indicates one or more activities prohibited for the virtual universe account while a limited use mode is activated; and program instructions, stored on at least one of the one or more storage devices for execution by at least one of the one or more processors via at least one of the one or more memories, to apply the policy while the limited use mode is activated.

* * * * *